(12) United States Patent
Eyal

(10) Patent No.: US 10,155,343 B2
(45) Date of Patent: Dec. 18, 2018

(54) GARMENT HAVING SEAM-LESS ELASTIC BAND, AND SYSTEM AND METHOD FOR PRODUCING SUCH GARMENT

(71) Applicant: Delta Galil Industries Ltd., Karmiel (IL)

(72) Inventor: Yoel Eyal, Tel Aviv (IL)

(73) Assignee: DELTA GALIL INDUSTRIES LTD., Caesarea (IL)

( * ) Notice: Subject to any disclaimer, the term of this patent is extended or adjusted under 35 U.S.C. 154(b) by 291 days.

(21) Appl. No.: 14/894,998

(22) PCT Filed: Jun. 5, 2014

(86) PCT No.: PCT/IB2014/061976
§ 371 (c)(1),
(2) Date: Dec. 1, 2015

(87) PCT Pub. No.: WO2014/195894
PCT Pub. Date: Dec. 11, 2014

(65) Prior Publication Data
US 2016/0107373 A1    Apr. 21, 2016

Related U.S. Application Data

(60) Provisional application No. 61/831,648, filed on Jun. 6, 2013.

(51) Int. Cl.
*B32B 3/10* (2006.01)
*B29C 65/74* (2006.01)
(Continued)

(52) U.S. Cl.
CPC ........ *B29C 65/7443* (2013.01); *A41D 27/245* (2013.01); *A41H 43/00* (2013.01);
(Continued)

(58) Field of Classification Search
None
See application file for complete search history.

(56) References Cited

U.S. PATENT DOCUMENTS 5,665,196 A   9/1997 Combe et al.
5,951,536 A   9/1999 Osborn et al.
(Continued)

OTHER PUBLICATIONS

International Search Report for corresponding PCT application PCT/IB2014/061976 dated Oct. 6, 2014.
(Continued)

*Primary Examiner* — Christopher M Polley
(74) *Attorney, Agent, or Firm* — Eitan Mehulal Sadot

(57) ABSTRACT

Garment having seam-less elastic band or synthetic band, and system and method for producing such garment. A method of producing a seam-less elastic band (105) comprises: providing an un-folded elongated elastic strip (101); folding at the elongated elastic strip (101) at a folding point (102) to create a first strip portion (102-103) overlapping on top of a second strip portion (103-104) of the elongated elastic strip (101), wherein the first strip portion (102-103) and the second strip portion (103-104) meet at a meeting point (104); performing an ultrasonic operation at the meeting point (104) on said first and second strip portion to create the seam-less elastic band (105) detached from a remainder of the elongated elastic band (101). The ultrasonic operations comprise one or more operations, ultrasonic cutting, ultrasonic welding, ultrasonic bonding, or other suitable ultrasonic operations.

14 Claims, 3 Drawing Sheets

(51) Int. Cl.
*B29C 65/08* (2006.01)
*A41H 43/00* (2006.01)
*B29C 65/00* (2006.01)
*A41D 27/24* (2006.01)

(52) U.S. Cl.
CPC .......... *B29C 65/08* (2013.01); *B29C 66/1162* (2013.01); *B29C 66/4322* (2013.01); *B29C 66/729* (2013.01); *A41D 2300/22* (2013.01); *A41D 2500/52* (2013.01); *B29C 66/1122* (2013.01); *B29C 66/1142* (2013.01); *B29C 66/71* (2013.01); *B29C 66/7315* (2013.01)

(56) References Cited

U.S. PATENT DOCUMENTS

| | | | |
|---|---|---|---|
| 6,197,138 | B1 | 3/2001 | McNichols |
| 8,110,053 | B2 | 2/2012 | Karlsson |
| 2005/0263520 | A1 | 12/2005 | Szucher |
| 2006/0150302 | A1* | 7/2006 | Warren .................. A41B 9/001 2/400 |

OTHER PUBLICATIONS

Wikipedia article—"Ultrasonic welding, section Medical industry", http://en.wikipedia.org/w/index.php?title=Ultrasonic_welding&oldid=552319814 NA, Apr. 26, 2013 (Apr. 26, 2013).

Wikipedia article—"Transdermal patch, section Components", http://en.wikipedia.org/w/index.php?title=Transdermal_patch&oldid=557543336 NA, May 30, 2013 (May 30, 2013).

* cited by examiner

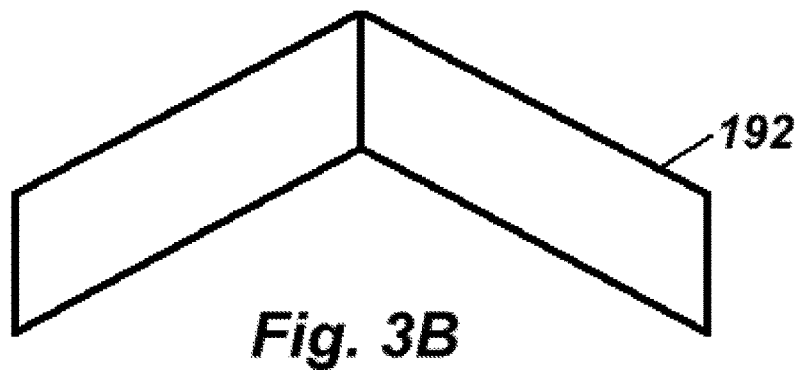

GARMENT HAVING SEAM-LESS ELASTIC BAND, AND SYSTEM AND METHOD FOR PRODUCING SUCH GARMENT

CROSS-REFERENCE TO RELATED APPLICATIONS

This application is a national phase of PCT international application number PCT/IB2014/061976, having an international filing date of Jun. 5, 2014, published as international publication number WO 2014/195894, which is hereby incorporated by reference in its entirety; which in turn claims priority and benefit from U.S. provisional patent application No. 61/831,648, titled "Garment Having Elastic Band, and System and Method for Producing Such Garment", filed on Jun. 6, 2013, which is hereby incorporated by reference in its entirety.

FIELD

The present invention relates to the field of garments and clothing.

BACKGROUND

Clothing may be formed of various materials, for example, textile, cotton, polyester, wool, leather, Nylon, blended yarns or the like. The amount and type of clothing worn may depend on gender and physical stature of the person, as well as social and geographic considerations.

Clothing may serve various, for example, protection from weather, enhance safety during hazardous activities (e.g., hiking or cooking), protecting the wearer from rough surfaces, protecting the wearer from rash-causing plants or insect bites or splinters, protecting the wearer from ultraviolet radiation, covering private body organs of the wearer, and/or insulating the wearer from cold or hot conditions.

SUMMARY

The present invention may include, for example, a garment having a seam-less elastic band or synthetic band, as well as systems and methods for producing such garment and such seam-less elastic band(s).

In accordance with the present invention, for example, a method of producing a seam-less elastic band (105) comprises: providing an un-folded elongated elastic strip (101); folding at the elongated elastic strip (101) at a folding point (102) to create a first strip portion (102-103) overlapping on top of a second strip portion (103-104) of the elongated elastic strip (101), wherein the first strip portion (102-103) and the second strip portion (103-104) meet at a meeting point (104); performing an ultrasonic operation at the meeting point (104) on said first and second strip portion to create the seam-less elastic band (105) detached from a remainder of the elongated elastic band (101). The ultrasonic operations comprise one or more operations, ultrasonic cutting, ultrasonic welding, ultrasonic bonding, or other suitable ultrasonic operations.

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 3A-3B demonstrate production of a V-shaped effect or ring or band, in accordance with the present invention.

DETAILED DESCRIPTION OF SOME EMBODIMENTS

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The present invention may comprise a garment or a clothing article having an elastic band (or a band formed of synthetic material(s)), as well as systems and methods for producing or manufacturing such garment.

The term "garment" as used herein may include, for example, a garment for men, a garment for women, a garment for children, a unisex garment, an underwear, undergarment, lingerie, long pants, short pants, sportswear or sporting apparel, a swimsuit, leggings, outerwear, activewear, or other suitable article or item that a person may wear.

The term "band" or "elastic band" may include, for example, a generally ring-shaped band or fabric which may be stretch-able (e.g., by pulling) or may be form-fitting, or may expand and/or reduce its diameter or radius or size due to pulling or releasing.

The present invention may comprise a garment having an elastic band (or a band formed of synthetic material or materials), such that the band may be produced and created as a closed loop or a closed ring in a seam-less process, or in a process that does not leave seams or stitches or threads that protrude or are visible or touch the skin of the wearer. The present invention may be used to create a V-shape or a U-shape, in a garment or a portion or area of the garment or band, and may allow welding the band or ring as a V-shaped or U-shaped ring or band.

Figure 1:
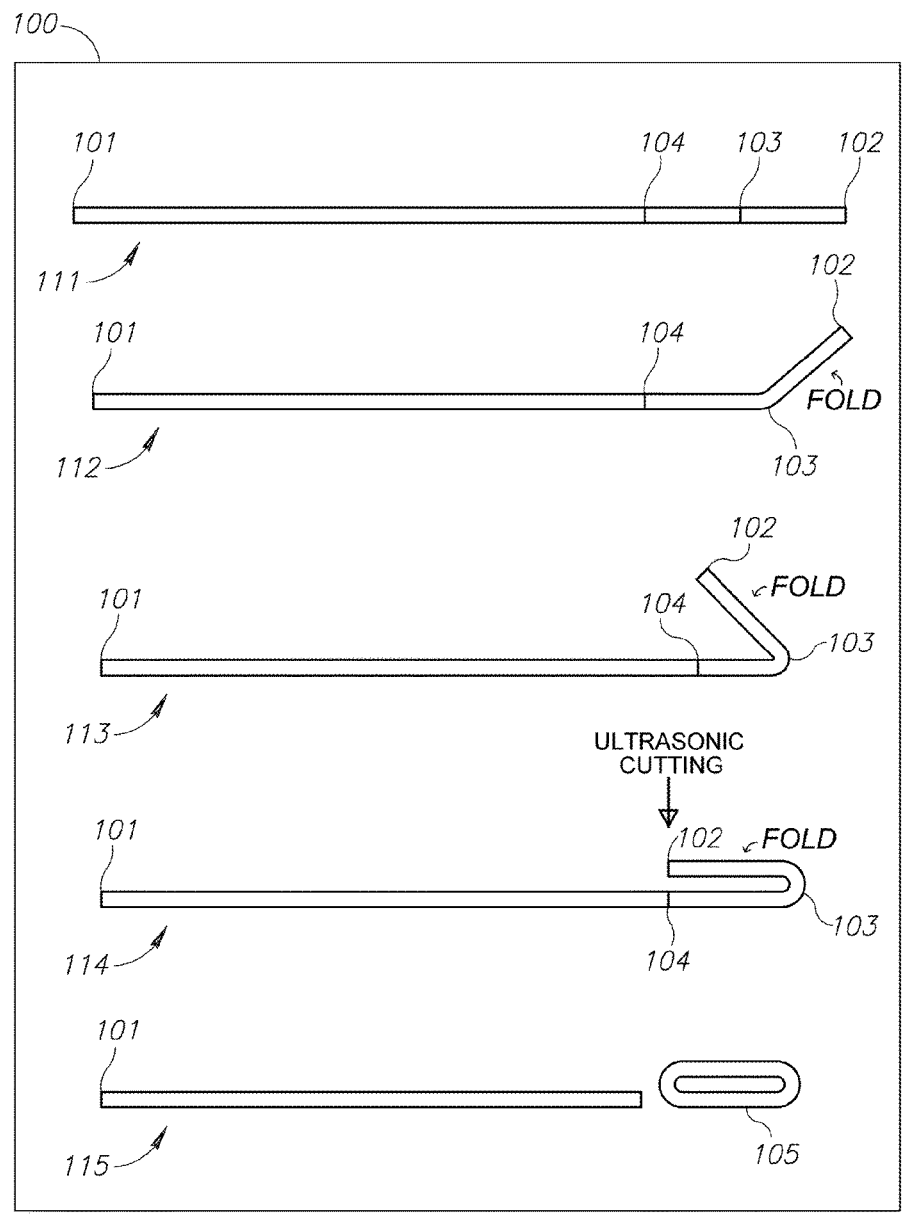
FIG. 1 is a schematic illustration demonstrating multiple stages in a process of manufacturing a seam-less elastic band, in accordance with the present invention.

Reference is made to FIG. 1, which is a schematic illustration demonstrating multiple steps 111-115 in a process 100 of manufacturing a seam-less elastic band, in accordance with the present invention.

As demonstrated in step 111, an elongated strip 101 of elastic (or fabric, or elastic covered by fabric) may be used, for example, having a width ranging from 1 centimeter to 5 centimeters; other suitable width values may be used. The elongated elastic strip 101 (or fabric, or elastic covered with fabric) may be obtained as a roll or a batch, and may be relatively long (e.g., a few meters long, or many meters long).

The elongated elastic strip 101 (or fabric, or synthetic material, or elastic covered by fabric) may have a first end-point 101, and a second end-point 102.

In a demonstrative example, an elastic band (or synthetic strip) is manufactured to have a circumference of K centimeters (for example, 70 centimeters).

Folding-point 103 may be located at K/2 centimeters from end-point 102; and cutting-point 104 may be located at K centimeters from end-point 102.

The strip portion 102-103 may be folded (step 112) over folding-point 103 and onto strip-portion 103-104 (step 113), such that end-point 102 may be located on top of, or parallel to, or in proximity to, meeting-point or cutting-point 104 (step 114). At the cutting-point 104, ultrasonic cutting-and-welding (step 115) may be performed (e.g., as concurrent or simultaneous operations, performed by a same or single device, at the same time and at the same point), thereby producing a seam-less elastic band 105 or seam-less elastic ring.

The strip portion 102-103 may be cut automatically, or manually, by using a cutter or scissors or an ultrasonic machine for cutting. Optionally, the elastic/synthetic strip may be cut approximately one centimeter longer then the desired length (K), as a subsequent operation may fold the elastic strip portion 102-103 and cut-and-weld by the ultrasonic machine at the elastic edges in order to create the elastic band or ring. In some embodiments, the cutting may be performed in a diagonal or slanted manner, to produce a V-shape or a V-shaped effect or property to the band or garment or portion of the garment.

Alternatively, an ultrasonic press cutting-and-welding machine, or an ultrasonic continuity cutting-and-welding machine, may be used; for example, an ultrasonic cutting machine manufactured by "Branson Ultrasonics Corporation" of Danbury, Conn., USA (e.g., available from Emerson Industrial Automation, at www.EmersonIndustrial.com).

The folding operation on the elastic strip (before the cutting-and-welding) may be performed or placed (e.g., manually, automatically by a machine, or semi-automatically) in the ultrasonic cutting machine, such that cutting-point 104 (and end-point 102 on top of it, or underneath it) may be located at the cutting region or cutting line of the ultrasonic cutting machine, for example, between the horn and the cutting blade. The ultrasonic cutting machine may be activated or actuated, and may cut the elongated elastic/synthetic strip at the cutting point 104, while providing ultrasonic vibrations at that region. This may result in a combined action of both cutting and welding or joining, of the fabric at end-point 102 with the fabric at cutting-point 104, thereby creating a welded ring or loop which may be used as an elastic band for a garment, or any finished band at the neckline, armhole, legs, or any other suitable area of garments.

The elastic/synthetic band may have no overlapping portions or regions; such that, points 104 and 102 may be glued directly to each other, without any fabric overlap, and without having any region in which two layers of fabric are glued or bonded one on top of the other, or are located one on top of the other.

The resulting elastic band may be more convenient and more comfortable to wear for a user, since it is seam-less and does not include any seams or stitches that may irritate the user's body, and does not include any region or portion that has thicker or dual-layer properties, and does not include any overlapping fabric regions; and the result may be attachment of two edges of the elastic/synthetic strip side-by-side to each other (e.g., connected by a thin welding line from the ultrasonic cutting-and-welding) to result an elastic band or ring, or V-shaped ring or band.

The elastic band or ring of the present invention may be more efficient (and cheaper, and quicker) to manufacture, as it may require, for example, a single person placing the elongated elastic strip within the (open) ultrasonic cutting machine, folding the strip as described and shown, and performing the ultrasonic cutting for a few seconds (e.g., approximately 3 or 5 seconds). Optionally, a ruler or stick or other dimension indication or marker may be used to help the operator of the machine with rapid folding of the strip at a pre-defined length (K/2). This may be in contrast with conventional methods, in which at least two or three persons may be required, to perform manual actions that produce an elastic band which, further, may irritate the skin due to stitches or overlapping fabric regions. Bonding of the elastic's edges, one edge near the other edge (without any overlap between the two edges) without welding by ultrasonic machine, may result in an elastic band or ring that may be easily torn or separated or ripped while the band or ring is being stretched.

The elastic band or ring of the present invention may be more efficient in garments having a located logo that is knitted into the elastic.

Optionally, the elastic band may be further processed by applying a gluing or bonding process in or near the region of ultrasonic cutting/welding. For example, a relatively small fabric (e.g., cotton, elastic fabric, or the like) may be glued or bonded at that area of the elastic band, by using glue and then performing bonding or gluing with a heat-generating pressing machine or heat-based sealing machine. This bonding operation may strengthen the welding area while the elastic ring or band is being stretched.

The small fabric or small elastic strip may be glued or bonded (or otherwise attached or connected) to an inner (internal) side of the elastic band or ring, or to the outer (external) side of the elastic band or ring, or to both the inner and outer sides of the elastic band or ring (e.g., as two pieces of fabric, or as one piece of fabric which folds or wraps around). The small fabric or small elastic strip may cover or hide the thin welding line at which the ultrasonic cutting was performed.

Optionally, in some embodiments, the small fabric or small elastic fabric may be glued or bonded or attached to the garment by using glue, liquid glue, spray glue, film, glue that passes or bonds through transfer, or other suitable glue; and the gluing may be performed by using a heat press machine. Alternatively, the gluing may be performed by a pressing operation utilizing an ultrasonic pressing machine, and a high frequency of the ultrasonic machine may generate vibrations that may melt or weld the glue. Optionally, the gluing may be performed by utilizing the ultrasonic machine without using any glue; for example, the high frequency of the ultrasonic machine may fuse or melt the synthetic threads of the elastic and may thus allow bonding or attaching.

Alternatively, the ultrasonic machine may be applied for gluing purposes, for example, in proximity to the thin ultrasonic cutting line; for example, approximately one centimeter near each one of the two sides of that line; by using a special horn of the ultrasonic machine or on the metal element below the horn, shaped as pyramid(s), able to penetrate into the elastic fabric and able to fuse or melt it from within; the fusion or melting of a wide area adjacent to the ultrasonic cutting line may further strengthen the ultrasonic cutting line, and may obviate the need to attach or glue a small fabric on top of the ultrasonic cutting line. Other suitable methods may be used.

Optionally, in some implementations in accordance with the present invention, the small piece of fabric or small elastic strip may be used to present or display or include a logo or branding information, to present imprinted information or embroidered information, to present washing or caring instructions, to present size or model information, or the like. The small piece of fabric or small elastic strip may have a distinct color, in order to assist in branding or the garment; and optionally may have a unique shape (e.g., a square, or a long rectangle) for similar or other purposes. The present invention may allow to bond any size of elastic width or fabric width or any other material(s), on or at or near the ultrasonic welded line or the ultrasonic welding line.

The elastic band may then be connected or attached to a suitable garment or article of clothing, for example, at the waist area, or at a neck area, or around hand area or wrist area, or around leg area or ankle area or foot area, or in other suitable area or region. The connection or attachment of the elastic band to the garment may be performed, for example, by sewing or stitching, manually or automatically or semi-automatically, by bonding or gluing, by heat-pressing, or by other suitable methods.

The elastic band or elastic ring may be connected by different elastics, for example, plane elastic welded (or otherwise connected or attached) to Jacquard elastic; or red elastic which may be welded (or otherwise connected or attached) to green color elastic or any different color or printed elastic.

Optionally, in some embodiments of the present invention, a Jacquard logo may be located at the center front of the waist region; the logo Jacquard may be welded and/or bonded to a plane elastic at two opposite edges; optionally utilizing two welding-and-bonding operations in one elastic band or ring.

Optionally, the elastic band may have or may utilize one or two (or multiple) connections or attachment mechanism, in order to connect different elastic colors and/or different kinds of elastics.

Optionally, in some embodiments, the elastic band or elastic ring may be connected to the garment at a suitable angle, or parallel to an end-line of the garment, or slanted relative to the end-line of the garment, or fully-overlapping or only partially-overlapping (and partially non-overlapping) to the waist region of the garment. For example, the rear waist region (towards the back) may high (or higher) relative to the front (stomach) waist region of the garment (e.g., pants or underwear).

Although portions of the discussion herein may relate, for demonstrative purposes, to elastic strip and/or to elastic band or ring, the present invention may be used in conjunction with non-elastic or semi-elastic strips or materials (e.g., synthetic material or synthetic materials), and may be used to produce a seam-less non-elastic or semi-elastic band or ring, by utilizing the ultrasonic cutting, welding, bonding operations of the present invention.

Although portions of the discussion herein may relate, for demonstrative purposes, to ultrasonic operations (e.g., cutting, welding, bonding) that are performed at a straight line, or in a direction which is general perpendicular to the long or longest dimension of the strip or the band, the present invention may be used in conjunction with non-straight ultrasonic operations, that may be performed at a slanted line or diagonal line relative to the longest dimension of the strip or the band; optionally producing a V-shaped effect or garment-region. The present invention may be used not only for producing elastic bands for the waist area; but rather, for producing V-shaped or U-shaped neck area in a shirt or other garment, by ultrasonic cutting performed diagonally in the closed position such that in an open position the result is V-shaped.

In some embodiments, the ultrasonic operation(s) may be preparatory operations. The strength of the welding may be achieved, in some embodiments, by bonding or gluing a strip made of fabric or elastic or synthetic material(s) over or on or near or at the ultrasonic welding line (straight or slanted). The bonding or gluing, performed on one side or two sides of the ultrasonic welding line, may limit or constrain the stretching and/or the burden on the ultrasonic welding line, and/or may distribute the pressure (e.g., by stretching) over a larger area or over an area (e.g., the entire bonding area, rather than a single line), and thus reduce the tension or forces that operate on the welding line itself, and improve the strength and durability of the product.

In some embodiments, the ultrasonic cutting/welding operations may be performed diagonally relative to the longest dimension of the strip/band, on two layers of the strips; to produce a diagonal or slanted cutting/welding line; such that, upon un-folding the item, a V-shaped ring or effect is achieved; which may be suitable for V-shaped shirts or necklines or for other suitable purposes or garments.

Reference is made to FIGS. 3A-3B, demonstrating production of a V-shaped effect or ring or band, in accordance with the present invention. FIG. 3A shows the elongated strip 101, having two layers folded one over the other; and being cut at diagonal line 191 by an ultrasonic operation (slanted ultrasonic cutting and/or welding). FIG. 3B shows that when the two layers of elongated strip 101 are unfolded, a V-shaped area 192 is formed at the ultrasonic welding line 191. FIG. 3B shows only a portion of the V-shaped item, which may be an entire ring or band having the V-shaped portion.

Figure 2:
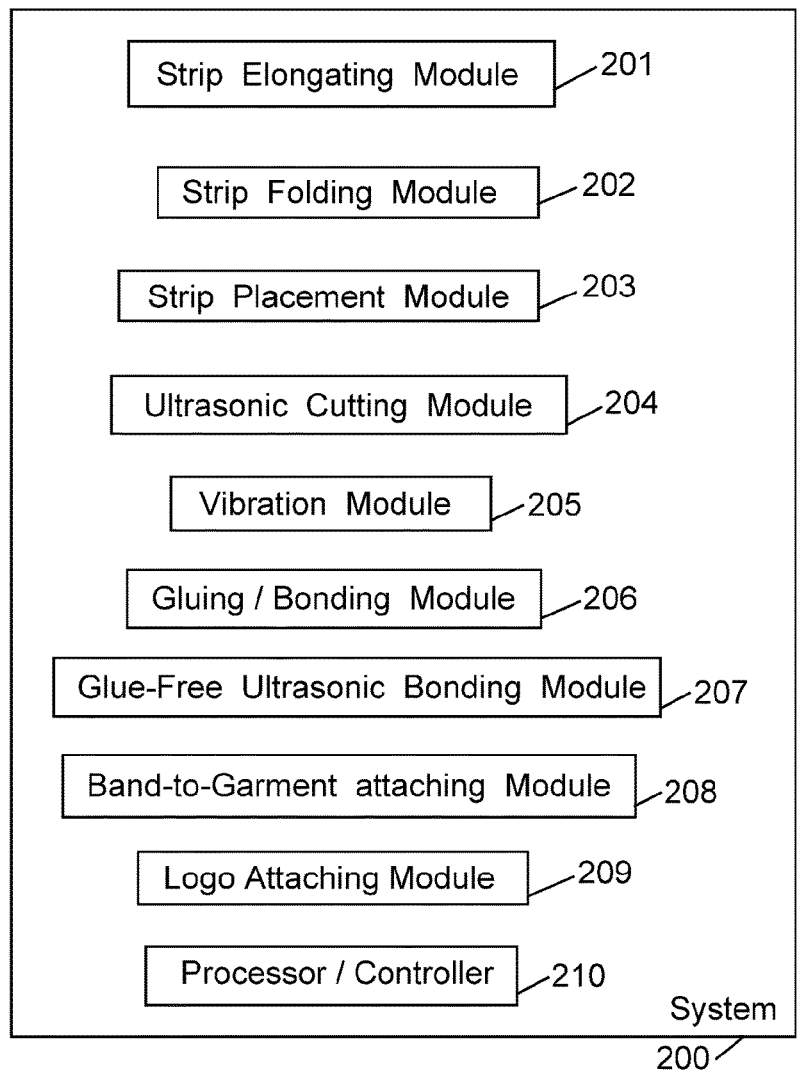
FIG. 2 is a schematic block-diagram illustration of a manufacturing system, in accordance with some demonstrative embodiments of the present invention.

Reference is made to FIG. 2, which is a schematic block-diagram illustration of a manufacturing system 200, in accordance with some demonstrative embodiments of the present invention. System 200 may operate to perform some or all of the operations discussed above, in an automated or automatic or semi-automatic manner.

System 200 may comprise, for example: a strip elongating module 201 able to un-roll or un-fold or un-pack or otherwise arrange the initial strip as an elongated un-folded roll; a strip folding module 202 able to fold the portion 102-103 of the strip as described above; a strip placement module 203 able to place the folded portion 102-103 on top of elongated strip; an ultrasonic cutting module 204 to perform ultrasonic cutting (or ultrasonic cutting-and-welding, or ultrasonic cutting-and-bonding, or ultrasonic cutting-and-gluing) at or near points 102 and 104 (which may overlap each other); a vibration module 205 to generate suitable (e.g., ultrasonic) vibration(s) enabling vibration ultrasonic operations (e.g., vibration-assisted ultrasonic cutting-and-welding, or vibration-assisted ultrasonic cutting-and-bonding, or vibration-assisted ultrasonic cutting-and-gluing; a gluing/bonding module 206 able to provide glue and/or bonding material(s) and/or heat, at the time of the ultrasonic operations and/or separately, at or near points 102 and 104; an optional pressing module (e.g. heat-based pressing module, or heat-seal pressing module, or ultrasonic pressing module) to perform pressing and/or gluing and/or bonding at or near points 102 and 104; a glue-free ultrasonic bonding module 207 able to perform bonding at or near points 102 and 104 without utilizing any glue, for example, by applying high frequency ultrasonic emissions which may fuse or melt the synthetic threads of the elastic strip and may thus allow glue-free bonding or attaching; a band-to-garment attaching module 208 to enable attachment or connection of the elastic band to another article or portion of a garment; a logo attaching module 209 to enable welding or bonding of a logo to the elastic strip or the elastic band (e.g., at two opposite edges, optionally by utilizing ultrasonic welding or ultrasonic bonding, and optionally utilizing two welding-and-bonding operations in one elastic band or ring). Other suitable modules may be used.

Some or all of the modules of system 200 may be controlled via a computing device or processor/controller 210, able to command, activate and/or deactivate the various modules in accordance with pre-defined instructions or code or program. Optionally, system 200 may further comprise robotic arms, robotic components, conveyor belts, and other suitable mechanical components able to move or shift or push or pull or fold or unfold the articles during the manufacturing process.

In some embodiments, a method of producing a seam-less elastic band (105), comprises: providing an un-folded elongated elastic strip (101); folding at the elongated elastic strip (101) at a folding point (102) to create a first strip portion (102-103) overlapping on top of a second strip portion (103-104) of the elongated elastic strip (101), wherein the first strip portion (102-103) and the second strip portion (103-104) meet at a meeting point (104); performing an ultrasonic operation at said meeting point (104) on said first and second strip portion to create said seam-less elastic band (105) detached from a remainder of said elongated elastic band (101).

In some embodiments, performing the ultrasonic operation comprises performing ultrasonic cutting.

In some embodiments, performing the ultrasonic operation comprises ultrasonic welding.

In some embodiments, performing the ultrasonic operation comprises performing ultrasonic cutting-and-welding.

In some embodiments, performing the ultrasonic operation comprises performing ultrasonic cutting using high-frequency vibrations.

In some embodiments, performing the ultrasonic operation comprises ultrasonic welding using high-frequency vibrations.

In some embodiments, performing the ultrasonic operation comprises performing ultrasonic cutting-and-welding using high-frequency vibrations.

In some embodiments, the method comprises: performing glue-free bonding of the first strip portion (102-103) and the second strip portion (103-104) at said meeting point (104).

In some embodiments, the method comprises: performing glue-free ultrasonic bonding of the first strip portion (102-103) and the second strip portion (103-104) at said meeting point (104).

In some embodiments, the method comprises: performing glue-free ultrasonic bonding of the first strip portion (102-103) and the second strip portion (103-104) at said meeting point (104); wherein the glue-free ultrasonic bonding comprises melting and fusing threads of the first and second strip portions by ultrasonic emissions.

In some embodiments, performing the ultrasonic operation at said meeting point (104) comprises: placing a fabric-made logo article bordering said meeting point (104); performing a first ultrasonic bonding at said meeting point (104) to weld together (a) the first strip portion, (b) the second strip portion, and (c) the fabric-made logo article; performing a second ultrasonic bonding at an edge of the fabric-made logo article that does not border said meeting point (104) to weld together (A) the fabric-made logo article, and at least one of: (i) the first strip portion, (ii) the second strip portion.

In some embodiments, the method comprises: attaching a fabric-made logo article to said seam-less elastic band.

In some embodiments, the method comprises: attaching said seam-less elastic band (105) to a garment.

In some embodiments, the elongated elastic strip (101) is a synthetic strip.

In some embodiments, the elongated elastic strip (101) is formed of one or more synthetic materials.

In some embodiments, the method comprises: bonding a strengthening element at an ultrasonic welding line of said ultrasonic operations, wherein the strengthening element comprises an element selected from the group consisting of: a label, a tape, an elastic tape, a synthetic tape, a logo, a fabric element, a non-stretchable element, a stretch limiting element.

In some embodiments, the method comprises: bonding a strengthening element in proximity to an ultrasonic welding line of said ultrasonic operations, wherein the strengthening element comprises an element selected from the group consisting of: a label, a tape, an elastic tape, a synthetic tape, a logo, a fabric element, a non-stretchable element, a stretch limiting element.

In some embodiments, the ultrasonic operation comprises ultrasonic welding of two layers; wherein the ultrasonic welding is performed in a straight line which is generally perpendicular to the longest direction of the elongated strip.

In some embodiments, the ultrasonic operation comprises ultrasonic welding of two layers; wherein the ultrasonic welding is performed in a diagonal line which is slanted relative to the longest direction of the elongated strip, thereby producing a V-shaped element at said ultrasonic welding area.

The present invention further includes a seam-less band produced by said methods; and garments or clothing articles produced by said method or incorporating such bands.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method of producing a seam-less elastic band (105), the method comprising:

providing an un-folded elongated elastic strip (101);

folding the elongated elastic strip (101) at a folding point (102) to create a first strip portion (102-103) overlapping on top of a second strip portion (103-104) of the elongated elastic strip (101), wherein the first strip portion (102-103) and the second strip portion (103-104) meet at a meeting point (104);

performing an ultrasonic operation of ultrasonic cutting-and-welding with high-frequency vibrations at said meeting point (104) on said first and second strip portions, at a same time and using a same single ultrasonic device, to create said seam-less elastic band (105) which is detached from a remainder of said elongated elastic strip (101);

wherein said ultrasonic operation further comprises performing ultrasonic bonding of the first strip portion (102-103) and the second strip portion (103-104) at said meeting point (104), by an ultrasonic pressing unit;

wherein the ultrasonic bonding comprises melting and fusing threads of the first and second strip portions by high-frequency ultrasonic emissions.

2. The method of claim 1, wherein performing the ultrasonic operation at said meeting point (104) comprises:
placing a fabric-made logo article bordering said meeting point (104);
performing a first ultrasonic bonding at said meeting point (104) to weld together (a) the first strip portion, (b) the second strip portion, and (c) the fabric-made logo article;
performing a second ultrasonic bonding at an edge of the fabric-made logo article that does not border said meeting point (104) to weld together (A) the fabric-made logo article, and at least one of: (i) the first strip portion, (ii) the second strip portion.

3. The method of claim 1, further comprising:
attaching a fabric-made logo article to said seam-less elastic band.

4. The method of claim 1, further comprising:
attaching said seam-less elastic band (105) to a garment.

5. The method of claim 1, wherein the elongated elastic strip (101) is a synthetic strip.

6. The method of claim 1, wherein the elongated elastic strip (101) is formed of one or more synthetic materials.

7. The method of claim 1, further comprising:
bonding a strengthening element at an ultrasonic welding line of said ultrasonic operations, wherein the strengthening element comprises an element selected from the group consisting of: a label, a tape, an elastic tape, a synthetic tape, a logo, a fabric element, a non-stretchable element, a stretch limiting element.

8. The method of claim 1, further comprising:
bonding a strengthening element in proximity to an ultrasonic welding line of said ultrasonic operations, wherein the strengthening element comprises an element selected from the group consisting of: a label, a tape, an elastic tape, a synthetic tape, a logo, a fabric element, a non-stretchable element, a stretch limiting element.

9. The method of claim 1, wherein the ultrasonic operation comprises ultrasonic welding of two layers; wherein the ultrasonic welding is performed in a straight line which is generally perpendicular to the longest direction of the elongated strip.

10. The method of claim 1, wherein the ultrasonic operation comprises ultrasonic welding of two layers; wherein the ultrasonic welding is performed in a diagonal line which is slanted relative to the longest direction of the elongated strip, thereby producing a V-shaped element at said ultrasonic welding area.

11. The method of claim 1,
wherein said ultrasonic operation comprises:
in addition to performing said ultrasonic cutting-and-welding with high-frequency vibrations at said meeting point (104), performing also another ultrasonic operation of ultrasonic cutting-and-welding with high-frequency vibration at a secondary meeting point of said first and second strip portions;
wherein said ultrasonic operation performed at said meeting point, and said other ultrasonic operation performed at said secondary meeting point, create said elongated elastic band (101).

12. The method of claim 1,
wherein said ultrasonic operation comprises:
performing said ultrasonic cutting-and-welding with high-frequency vibrations at said meeting point (104) while said first and second fabric portions are pressed therein.

13. The method of claim 1,
wherein said ultrasonic operation comprises:
performing said ultrasonic cutting-and-welding with high-frequency vibrations at said meeting point (104) while said first and second fabric portions are pressed therein and are non-moving relative to the ultrasonic pressing unit.

14. The method of claim 1,
wherein said ultrasonic operation comprises ultrasonic welding concurrently with ultrasonic cutting, at said meeting point (104), at the same time and using the same single ultrasonic device.

* * * * *